(12) United States Patent
Morselli et al.

(10) Patent No.: US 8,862,348 B2
(45) Date of Patent: Oct. 14, 2014

(54) CONTROL OF A CONTINUOUSLY VARIABLE TRANSMISSION

(75) Inventors: Riccardo Morselli, San Vito di Spilamberto (IT); Massimo Baroni, Castellarano (IT); Francesco Roli, Vignola (IT)

(73) Assignee: CNH Industrial America LLC, New Holland, PA (US)

( * ) Notice: Subject to any disclaimer, the term of this patent is extended or adjusted under 35 U.S.C. 154(b) by 712 days.

(21) Appl. No.: 12/569,843

(22) Filed: Sep. 29, 2009

(65) Prior Publication Data

US 2011/0077829 A1  Mar. 31, 2011

(30) Foreign Application Priority Data

Sep. 30, 2008 (IT) .............................. BO2008A0597

(51) Int. Cl.
*G06F 19/00* (2011.01)
*G01L 5/13* (2006.01)

(52) U.S. Cl.
USPC ................... 701/54; 477/77; 477/68; 477/84; 123/319

(58) Field of Classification Search
USPC .................... 701/51, 52, 53, 61, 54, 69, 68; 73/117.3; 180/65.4, 65.3, 65.2; 903/921, 922; 477/83, 84, 85, 77, 68; 123/399, 361

See application file for complete search history.

(56) References Cited

U.S. PATENT DOCUMENTS

| 4,727,771 | A | * | 3/1988 | Niwa et al. ...................... 477/48 |
| 5,586,953 | A | * | 12/1996 | Abo ................................ 477/47 |
| 5,724,866 | A | * | 3/1998 | Minowa et al. .................. 74/664 |
| 6,095,117 | A | * | 8/2000 | Minowa et al. ............... 123/399 |
| 6,343,470 | B1 | | 2/2002 | Nanri |
| 6,394,930 | B1 | * | 5/2002 | Reuschel ......................... 477/83 |
| 7,114,585 | B2 | * | 10/2006 | Man et al. .................. 180/65.21 |
| 7,197,915 | B2 | * | 4/2007 | Luh et al. .................... 73/115.02 |
| 7,278,503 | B1 | * | 10/2007 | Kato et al. ................. 180/65.22 |
| 2004/0014557 | A1 | | 1/2004 | Carlson |
| 2005/0282682 | A1 | | 12/2005 | Ishii |
| 2007/0137338 | A1 | | 6/2007 | Nishi |

* cited by examiner

*Primary Examiner* — Ronnie Mancho
(74) *Attorney, Agent, or Firm* — Sue C. Watson

(57) ABSTRACT

A method is described for operating a vehicle fitted with a continuously variable transmission (CVT) and having a lever for varying the transmission ratio of the CVT to permit the vehicle operator to vary the vehicle wheel speed. In the invention, the transmission ratio of the CVT is limited to a value dependent upon at least one of the prevailing engine speed and the rate of change of the engine speed.

8 Claims, 1 Drawing Sheet

CONTROL OF A CONTINUOUSLY VARIABLE TRANSMISSION

FIELD OF THE INVENTION

The present invention relates to the control of a continuously variable transmission (CVT) in a vehicle, in particular an agricultural vehicle, in which the wheel speed is varied by setting the transmission ratio of the CVT.

BACKGROUND OF THE INVENTION

In certain tractors fitted with a CVT, in particular utility or compact tractors, the engine is controlled by means of both a hand lever and a foot lever, the latter being also referred to herein as a pedal. The engine operating point is chosen to correspond to the higher of two speed values demanded by the positions of the hand and foot levers. In normal operation, the engine operating point remains substantially constant and the wheel speed of the vehicle is varied by setting the transmission ratio in dependence upon the position of the foot lever. As the foot lever is depressed, the transmission ratio is increased to increase the wheel speed and this in turn increases the engine load. As long as the engine output power is capable of meeting the torque demand, the engine speed does not change appreciably when the foot pedal demands a lower engine speed than the hand lever, otherwise pressing the pedal results both in an increase of the transmission ratio and in an increase in the engine speed.

If, however, the vehicle is subjected to a sudden increase in wheel load, such as if the vehicle commences to travel up an incline, and the engine output power cannot be increased to meet the additional torque demand, then the engine speed will decrease and wheel speed will drop. The natural tendency of a driver under such conditions is to depress the foot lever still further, i.e. to treat the foot lever in the same way as an accelerator pedal and to accelerate harder. This, however, has an opposite effect to that desired by the operator, in that the demanded increase in transmission ratio will add to the engine load and cause the engine speed to drop further. This can ultimately result in stalling of the engine and the vehicle.

SUMMARY OF THE INVENTION

With a view to mitigating the foregoing disadvantage, the present invention provides a method of operating a vehicle fitted with a CVT and having a lever for varying the transmission ratio of the CVT to permit the vehicle operator to vary the vehicle wheel speed, characterised in that the transmission ratio of the CVT is limited to a value dependent upon at least one of the prevailing engine speed and the rate of change of the engine speed.

Preferably, the limit value of the transmission ratio increases with engine speed within a lower range of engine speeds and is substantially constant throughout a contiguous higher range of engine speeds.

By limiting the value of the transmission ratio at lower engine speeds, the invention prevents the operator from placing excessive torque demands on the engine and thus avoids potential stalling of the engine and the vehicle.

In accordance with a second aspect of the invention, there is provided a vehicle having an engine, a CVT, a lever for enabling an operator of the vehicle to vary the vehicle speed, and a control unit for applying to the CVT a signal for setting the value of the transmission ratio in dependence upon the position of the lever, characterised by means for preventing the signal applied by the control unit to the CVT from exceeding a limit value dependent upon at least one of the prevailing engine speed and the rate of change of the engine speed.

Preferably, the lever for varying the transmission ratio serves additionally in setting the operating point of the engine.

Conveniently, the lever is a foot operated pedal. If desired, the vehicle may additionally comprise a second, hand operated, lever, and means for setting the operating point of the engine in dependence upon the higher of two desired values determined from the positions of the foot pedal and the hand operated lever.

BRIEF DESCRIPTION OF THE DRAWINGS

The invention will now be described further, by way of example, with reference to the accompanying drawings, in which.

DETAILED DESCRIPTION OF THE PREFERRED EMBODIMENT

Figure 1:
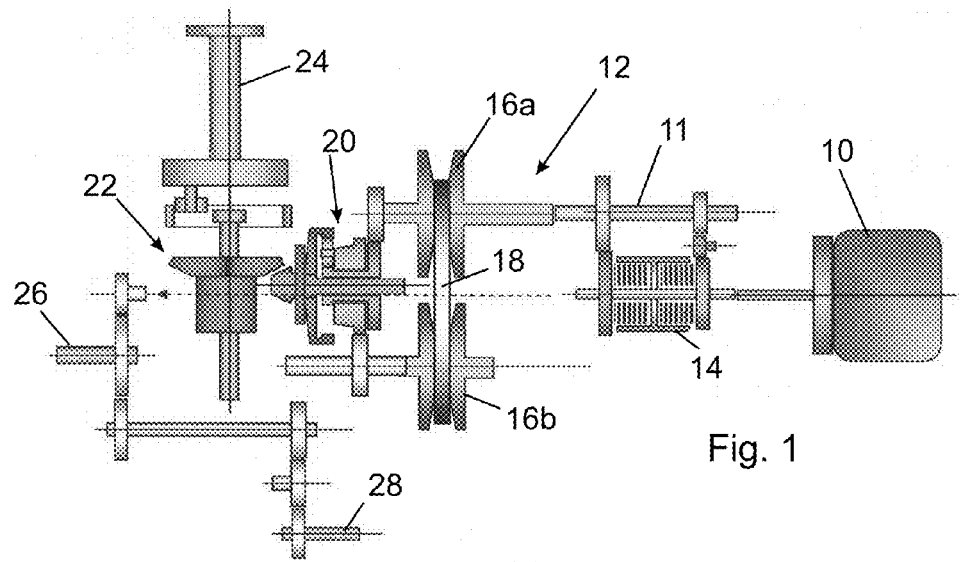
FIG. 1 is a simplified illustration of the power train of a utility tractor.

The power train shown in FIG. 1 is conventional and is used in compact tractors. An engine 10 is coupled to the input shaft 11 of a continuously variable transmission 12 through a shift clutch 14, which allows the engine to drive the tractor selectively in a forwards mode and in a reverse mode.

The CVT 12 comprises two cone sheaves 16a and 16b connected to one another by a belt or chain 18. Each of the cone sheaves is a pulley comprised of two conical sides that can be moved towards and away from one another so as to allow the effective diameter of the pulley to be varied continuously. A control unit sets the separation between sides of both cone sheaves to vary the transmission ratio of the CVT 12. Instead of operating mechanically, as just described, the CVT may be of a type that operates electrically or hydrostatically.

The cone sheaves 16a and 16b are connected respectively to drive the sun gear and planet carrier of planetary gear set 20, the output of which drives the axles 24 that are connected to the drive wheels of the tractor through a differential mechanism 22. Additionally, provision is made in the drive train for the engine 10 to drive a rear power take-off (PTO) shaft 26 and a mid PTO shaft 28.

As the power train of FIG. 1 is conventional, it is believed that its operation will be clear to the person skilled in the art without the need for more detailed explanation. In operation, the engine runs at a constant speed, selected to provide maximum efficiency or power.

Typically, the engine will operate at 2600 rpm and will drive the rear PTO at, for example, 540 rpm and the mid PTO at 1000 rpm. The tractor speed is varied by altering the effective diameters of the two cone shaves 16a and 16b of the CVT 12.

Figure 2:
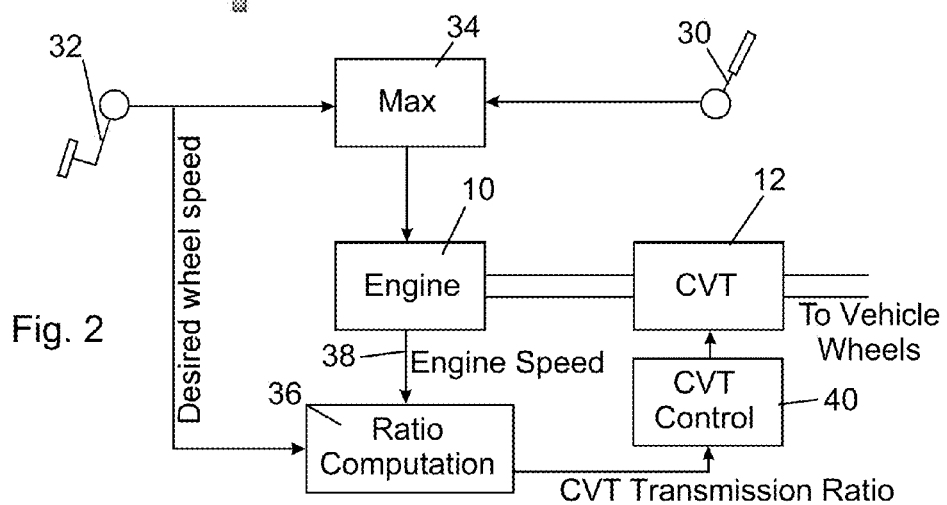
FIG. 2 is a schematic diagram of a control system for setting the transmission ratio of the CVT shown in FIG. 1.

Referring now to the schematic diagram of FIG. 2, the tractor controls include both a hand lever 30 and a foot pedal 32. The position of each of these two levers 30, 32 corresponds to a desired value of engine speed and the higher of the two values is selected by a unit 34 and used to set the speed of the engine 10. The unit 34 may operate electrically but in the preferred embodiment of the invention it operates mechanically and is connected by wires or Bowden cables to levers 30 and 32.

The position of only the foot pedal 32 is used to indicate the desired wheel speed, that is to say the desired road speed of the vehicle. This signal is applied to a ratio computation unit 36 which transmits a signal to a CVT control unit 40 that sets the effective diameter of the cone sheaves of the CVT 12.

As so far described, the control system is generally conventional. In prior art systems, the transmission ratio of the CVT 12 was calculated by the ratio computation unit 36 in dependence solely on the position of the foot pedal 32, without regard to the prevailing engine speed. As a result, if the torque demand placed on the engine exceeded its capability, the engine speed would drop. In such circumstances, the operator would by natural tendency depress the foot pedal further and thus increase the load on the engine, which then risked causing the engine to stall.

In the present invention, to avoid this risk, the ratio computation unit 36 is further connected to receive over a line 38 an input signal from the engine indicative of its prevailing speed. Depending on the engine speed, an upper limit is placed by the ratio computation unit 36 on the transmission ratio that can be set using the foot pedal 32.

Figure 3:
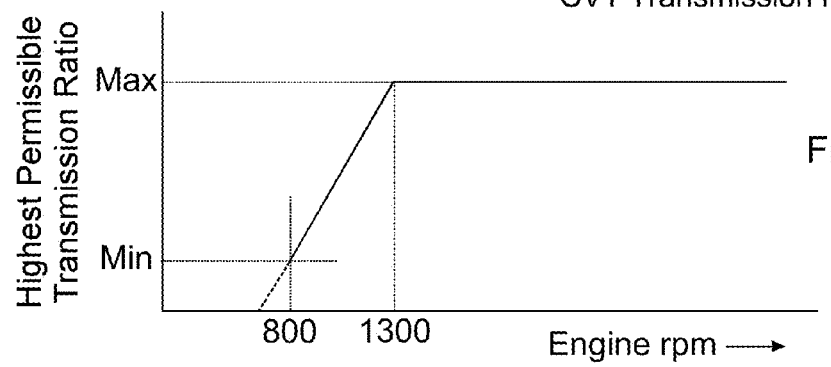
FIG. 3 is a graph showing the highest permissible value at which the transmission ratio of the CVT can be set at different engine speeds to avoid stalling of the engine and the vehicle.

The graph of FIG. 3 shows the highest CVT ratio that can be set at any time by the position of the foot pedal 32 plotted against the prevailing engine speed. The maximum and minimum values of the transmission ratio are determined by the range of effective diameters of the cone sheaves of the CVT. So long as the engine speed is above 1300 rpm, the foot pedal 32 alone will determine the transmission ratio of the CVT to produce the desired wheel speed.

Within the range of 800 rpm to 1300 rpm, however, a limit is placed on transmission ratio to prevent stalling. Hence, at 800 rpm the engine, when the engine is near its idling speed, selecting a high transmission ratio would cause the engine to stall. At this engine speed therefore, only the minimum possible transmission ratio can be set by the control unit 36. The upper limit increases gradually with engine speed and the full range of transmission ratios can be set once the engine speed has reached 1300 rpm.

If the engine speed attempts to drop below 800, as depicted by the broken line in FIG. 3, the engine risks stalling because the transmission ratio cannot be reduced any further. At this time, the clutch 14 needs to be disengaged to prevent the engine from stalling.

The graph in FIG. 3 shows a linear relationship between the speed and the highest permissible transmission ratio in the range from 800 rpm to 1300 rpm. This need not necessarily be the case as the highest permissible transmission ratio at any given engine speed can be matched to the torque curve of the engine.

In the above description, the highest permissible transmission ratio is determined only by the prevailing engine speed. It will be appreciated, however, that a risk of stalling can be detected by the rate of change of engine speed, that is to say the time derivative of the prevailing engine speed. If the engine speed drops, its rate of change is an indication that the torque demand being placed upon is excessive. This indication can be used either instead of, or more preferably in addition to, the prevailing engine speed value to reduce the transmission ratio by placing an upper limit that varies with the rate of change. Thus, if the engine speed drops rapidly from say 2600 rpm to 2200 rpm, even though both these value are in excess of 1300 rpm, an upper limit can be placed on the transmission ratio by the ratio computation unit 36 to ensure that the engine continues to operate at a speed near its optimum range. Using both the prevailing speed and the rate of change of the speed allows the control system to respond sooner to an excessive torque demand that could risk causing the engine to stall.

We claim:

1. A method of operating an agricultural vehicle fitted with a CVT and having a lever for varying a transmission ratio of the CVT within a range to permit an agricultural vehicle operator to vary vehicle wheel speed without causing an engine to stall, including the steps of:
   receiving a signal in a ratio computation unit indicative of a position of the lever, the position of the lever indicative of a desired wheel speed;
   receiving a signal from the engine in the ratio computation unit indicative of an engine speed;
   determining the transmission ratio of the CVT in the ratio computation unit for the desired wheel speed, wherein the transmission ratio for the desired wheel speed is determined from the position of the lever, the transmission ratio for the desired wheel speed is limited to an upper limit, and the upper limit is determined based on the engine speed and a rate of change of the engine speed; and
   transmitting the transmission ratio from the ratio computation unit to a CVT control unit to control the vehicle wheel speed.

2. The method as claimed in claim 1, wherein the upper limit of the transmission ratio increases with engine speed within a lower range of engine speeds and is substantially constant throughout a contiguous higher range of engine speeds.

3. The method as claimed in claim 1, including the step of disengaging a clutch of the agricultural vehicle when the engine speed falls below a stall limit value.

4. The method as claimed in claim 1, wherein both the engine speed and the rate of change of the engine speed are used to determine the transmission ratio, such that the upper limit is determined by the engine speed limit; wherein the engine speed limit varies with the rate of change of the engine.

5. An agricultural vehicle comprising:
   an engine,
   a CVT,
   a lever for enabling an operator of the agricultural vehicle to vary vehicle speed,
   a control system connected directly to the engine, the lever, and the CYT, wherein the control system is configured to:
      receive a signal in a ratio computation unit indicative of a position of the lever, the position of the lever indicative of a desired wheel speed;
      receive a signal from the engine in the ratio computation unit indicative of an engine speed;
      determine the transmission ratio of the CVT in the ratio computation unit for the desired wheel speed, wherein the transmission ratio for the desired wheel speed is determined from the position of the lever, the transmission ratio for the desired wheel speed is limited to an upper limit, and the upper limit is determined based on the engine speed and a rate of change of the engine speed; and
      transmit the transmission ratio from the ratio computation unit to a CVT control unit to control the vehicle wheel speed.

6. The agricultural vehicle as claimed in claim 5, wherein the lever for varying the transmission ratio serves additionally in setting an operating point of the engine.

7. The agricultural vehicle as claimed in claim 6, wherein the lever is a foot operated pedal.

8. The agricultural vehicle as claimed in claim 7, comprising a second, hand operated, lever, and means for setting the operating point of the engine in dependence upon the higher of two desired values determined from the positions of the foot pedal and the hand operated lever.

\* \* \* \* \*